UNITED STATES PATENT OFFICE.

BENTON S. REED, OF SPRINGFIELD, MISSOURI.

COMPOSITION FOR RENDERING OIL-PAINT TRANSPARENT.

1,245,968.   Specification of Letters Patent.   Patented Nov. 6, 1917.

No Drawing.   Application filed February 27, 1917.   Serial No. 151,209.

*To all whom it may concern:*

Be it known that I, BENTON S. REED, a citizen of the United States, and a resident of Springfield, in the county of Greene and State of Missouri, have invented a certain new and useful Improvement in Compositions for Rendering Oil-Paint Transparent, of which the following is a specification.

My invention relates to compositions of matter, more particularly a composition for use in connection with oil paints, so as to render said paints transparent, and it consists in the ingredients hereinafter specified.

For centuries men have been seeking for the secret of the transparent tones to be found in the flesh colors, etc., painted by the old masters. It has been found by extensive research of manuscript and personal letters of these master-painters that the paints used then were practically the same as the paints used now, but that the beautiful transparency of their painting was produced by exposing each painting and superimposed painting or glazing, as it is sometimes called, to the rays of the sun. This has the effect of gradually rendering the paints more transparent. This process took weeks and sometimes months to attain.

The primary object of my invention is to provide a composition of matter which may be mixed with the colors, thereby rendering them transparent. The amount of transparency will, of course, depend upon the proportions of the color and the composition of matter.

A further object of my invention is to provide a composition of matter of the type described, which may be put up in convenient form, such as in collapsible tubes, and which will retain its consistency when not exposed to air, for an unlimited period.

A further object of my invention is to provide a composition of matter of the type indicated, which will have no chemical effect on the colors themselves, and which therefore insures the permanency of the colors that would not be obtained by the use of other means which would tend at all to react chemically with the colors.

In carrying out my invention I make use of an inert substance, such as ground glass, which is transparent, and a suitable vehicle. For the vehicle I use clear linseed oil. Since the oil colors used by artists are ground in linseed oil, and the composition of matter contains only linseed oil and ground glass, it will be readily seen that there can be no chemical action between the composition of matter and the linseed oil which forms the vehicle for the color.

The glass is ground preferably to a very fine powder, and is mixed with the oil in different proportions, depending upon the work to be done. Ordinarily I would propose to use equal parts of glass and linseed oil.

Modern methods of painting do not permit of the length of time which was necessary formerly to secure the transparent tones. I may obtain this transparency with the original application of the paint, when the latter is mixed to any extent of transparency desired with my improved composition. Modern oil colors are opaque, but with my composition any desired degree of transparency may be attained by a judicious mixture of the color with the medium.

As an incidence of its application, a summer sky could be very effectively painted by using an undertone of yellow or even yellow canvas, and a subsequent painting or glazing in blues and reds composed of ordinary oil colors, and my improved composition of matter mixed to any consistency which the artist desires.

The composition of matter of course can be thinned by mixing in more linseed oil, in the same manner that the opaque colors may be thinned. The composition of matter may be incorporated with the oil colors on the palette with a palette knife, or by means of brushes.

With my improved composition of matter, the transparent shadows of nature may be rendered to perfection. The very color of the atmosphere and light itself can be interpreted with the beautiful transparent tones of my composition of matter in the hands of an artist.

I claim:

1. A composition of matter for rendering oil paint transparent, which consists of a mixture of ground glass and linseed oil.

2. A composition of matter for rendering oil paint transparent, which consists of equal parts of ground glass and linseed oil.

BENTON S. REED.

Witnesses:
S. A. REED,
MARY E. JONES.